United States Patent
Takahashi

[19]

[11] Patent Number: 5,555,855
[45] Date of Patent: Sep. 17, 1996

[54] WATER CIRCULATION SYSTEM FOR MARINE ENGINE

[75] Inventor: Masanori Takahashi, Hamamatsu, Japan

[73] Assignee: Sanshin Kogyo Kabushiki Kaisha, Hamamtsu, Japan

[21] Appl. No.: 371,413

[22] Filed: Jan. 11, 1995

[30] Foreign Application Priority Data

Jan. 11, 1994 [JP] Japan .................................. 6-001285
Jan. 11, 1994 [JP] Japan .................................. 6-001286
Jan. 11, 1994 [JP] Japan .................................. 6-001287

[51] Int. Cl.⁶ ........................................................ F01P 7/14
[52] U.S. Cl. ................................. 123/41.08; 123/41.31; 123/545; 123/196 CP
[58] Field of Search ........................... 123/41.08, 41.09, 123/41.31, 545, 184.39, 184.41, 184.53, 196 W, 196 P

[56] References Cited

U.S. PATENT DOCUMENTS

| | | | |
|---|---|---|---|
| 1,938,252 | 12/1933 | Hamacheck | 123/184.41 |
| 3,024,774 | 3/1962 | Eby | 123/184.39 |
| 3,105,472 | 10/1963 | Jasper | 123/41.08 |
| 3,358,654 | 12/1967 | Shanahan et al. | 123/41.08 |
| 4,399,797 | 8/1983 | Iwai | 123/545 |
| 4,516,538 | 5/1985 | Arakawa et al. | 123/184.41 |
| 5,109,809 | 5/1992 | Fujimoto | 123/41.08 |
| 5,383,440 | 1/1995 | Koishikawa et al. | 123/196 W |

FOREIGN PATENT DOCUMENTS

| | | |
|---|---|---|
| 63-192693 | 8/1963 | Japan . |
| 64-4851 | 1/1964 | Japan . |

*Primary Examiner*—Noah P. Kamen
*Attorney, Agent, or Firm*—Knobbe, Martens Olson & Bear

[57] ABSTRACT

A water circulation system of a marine engine improves the consistency of engine combustion by stabilizing the temperature of water flowing through the engine water jacket and by heating the intake manifold to a temperature within a desired temperature range. The desired temperature range is defined so as to optimize fuel vaporization without significantly affecting the volumetric efficiency of the engine. The water circulation system includes a control valve which directs water flow through the circulation system according to the water temperature exiting the engine water jacket. The valve recirculates water between the engine water jacket and a recirculation path until the water temperature reaches a predetermined lower temperature limit. The control valve then allows a portion of the water to flow through a heating jacket around the intake manifold to heat the intake manifold. If the temperature of the recirculating water reaches a predetermined upper temperature limit, the control valve directs all of the water through the heating jacket until the temperature of the water exiting the engine water jacket falls below the upper temperature limit. In this manner, the water circulation system generally stabilizes the water temperature in the engine water jacket and heats the intake manifold to a temperature generally within the upper and lower temperature limits.

23 Claims, 5 Drawing Sheets

WATER CIRCULATION SYSTEM FOR MARINE ENGINE

BACKGROUND OF THE INVENTION

1. Field of the Invention

The present invention relates generally to a marine outboard drive, and more particularly to a marine engine.

2. Description of Related Art

Many types of marine engines include an induction system which forms and delivers a fuel charge to the engine. Such induction systems commonly include at least one charge former (e.g., a carburetor) which communicates with an intake manifold that delivers the fuel charge to the internal combustion engine.

Such induction systems, however, tend to deliver inconsistent air/fuel mixtures (i.e., the ratio between air and fuel varies), especially when operated in cold weather. The fuel of the air/fuel mixture deposits on the cool inner surfaces of the intake manifold, thus altering the ratio of fuel to air within the fuel charge. Engine combustion consequently becomes inconsistent.

Engine combustion inconsistence also occurs in prior marine internal combustion engines because temperature differences exist between the upper and lower portions of the engine. Conventional water cooling systems of marine engines continuously draw water from the body of water in which the marine drive is operated and force the water up through the engine. The water flowing through the lower portion of the engine is cooler than the water flowing through the upper portion of the engine. The water thus absorbs more heat at the lower portion of the engine than at the upper portion and consequently a temperature difference occurs between the upper and lower portions of the engine.

This problem is particularly acute in outboard motors where the combustion chambers are positioned vertically above one another. The temperature of the lowermost cylinder commonly is less than the temperature of the uppermost cylinder as a result of the lower portion of the engine being cooler than the upper portion of the engine. The resulting temperature differential between cylinders affects the consistence of fuel combustion between cylinder.

SUMMARY OF THE INVENTION

A need therefore exists for a water circulation system which generally stabilizes water temperature through the water jacket of the engine and also heats the intake manifold to maintain the vaporization of fuel of the fuel charge as it passes through the intake manifold, without significantly affecting the volumetric efficiency of the engine.

In accordance with an aspect of the present invention, a water circulation system stabilizes the water temperature within a watercraft engine. The water circulation system comprises an engine water jacket formed within the engine and a control valve which communicates with the engine water jacket through an inlet port. A recirculation conduit connects to a first outlet port of the control valve and communicates with an inlet of the engine water jacket so as to recirculate water through the engine water jacket. A water exhaust conduit connects to a second outlet port of the control valve and communicates with the exhaust discharge system of the engine so as to discharge cooling water from the water circulation system. The control valve is adapted to prevent water flow through the second port and to direct water flow through the first port when the temperature of the water entering the valve from the engine water jacket is below a desired preset lower temperature limit.

Another aspect of the present invention involves a water circulation system for a watercraft engine of the type including an intake manifold and an exhaust discharge system. The water circulation system comprises a heating jacket which is configured to extend along at least a portion of the intake manifold. A control valve communicates with the heating jacket through a first outlet port of the control valve. The valve is adapted to prevent water flow through the heating jacket when the temperature of the water is below a desired preset lower temperature limit.

In accordance with an additional aspect of the present invention, an intake manifold is provided to supply a fuel charge equally to a plurality of intake passages of a marine engine. The intake passages communicate with a plurality of combustion chambers within the engine. The intake manifold comprises an inlet which opens into a chamber. The chamber has a generally symmetric shape relative to a centerline of the inlet and terminates at a divider positioned opposite of the inlet. The divider also is positioned generally symmetric to the centerline of the inlet. The chamber communicates with a plurality of runners via outlets in the chamber. The outlets are positioned proximate to the divider. The runners extend between the chamber and the plurality of intake passages so as to place the chamber in communication with the intake passages.

BRIEF DESCRIPTION OF THE DRAWINGS

These and other features of the invention will now be described with reference to the drawings of a preferred embodiment which is intended to illustrate and not to limit the invention, and in which.

DETAILED DESCRIPTION OF A PREFERRED EMBODIMENT

Figure 1:
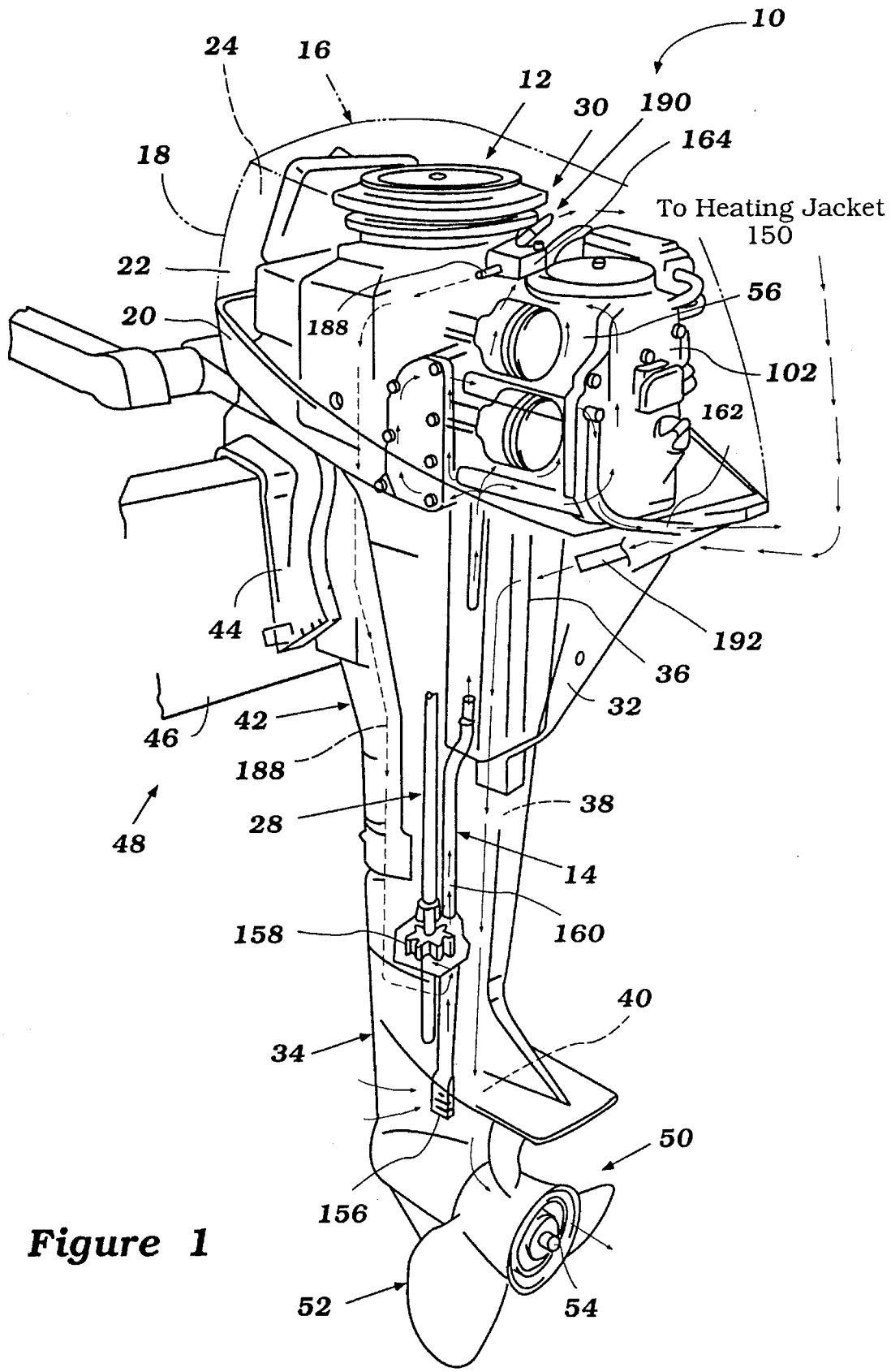
FIG. 1 is a perspective sectional view of a watercraft outboard drive including an engine and water circulation system configured in accordance with a preferred embodiment of the present invention.

FIG. 1 illustrates a marine outboard drive 10 having an internal combustion engine 12 which incorporates a water circulation system 14 configured in accordance with a preferred embodiment of the present invention. Though it is understood that the present water circulation system 14 can be incorporated into any type of marine engine, the present invention is particularly well suited for use with a vertically oriented engine of a marine outboard motor. It is contemplated, however, that certain aspects of the invention can be employed with a motor of an inboard/outboard drive equally as well.

In the illustrated embodiment, the outboard drive 10 has a power head 16 formed in part by the engine 12. The engine 12 desirably is a four-stroke, in-line, two-cylinder internal combustion engine. It will be readily apparent to those skilled in the art, however, that the present water circulation system 14 may be employed with engines having other number of cylinders, having other cylinder orientations, and/or operating on other than a four-stroke principal.

A protective cowling 18 of a known type surrounds the engine 12. The cowling 18 desirably includes a lower tray 20 and a top cowling member 22. These components 20, 22 of the protective cowling 18 together define an engine compartment 24 which houses the engine 12.

As understood from FIG. 1, the engine 16 is mounted conventionally with its output shaft 26 (i.e., crankshaft—see FIG. 2) rotating about a generally vertical axis. The crankshaft 26 is suitably journaled within the engine 12, as described below, and drives a drive shaft 28. The drive shaft 28 depends from the power head 16 of the outboard drive 10. A standard magneto generator/flywheel assembly 30 is attached to the upper end of the crankshaft 24.

As seen in FIG. 1, a drive shaft housing 32 extends downward from the lower tray 20 and terminates in a lower unit 34. The drive shaft housing 32 houses an exhaust pipe 36 which communicates with the exhaust system of the engine 12. The exhaust pipe 36 also terminates in an expansion chamber 38 formed in the drive shaft housing 32. The expansion chamber 38 in turn communicates with an exhaust discharge passage 40 formed in the lower unit 34 which directs the exhaust flow through a propulsion device. In this manner, engine exhaust is discharged to a submerged region of reduced water pressure behind the propulsion device to facilitate exhaust flow through the expansion chamber 38 and the discharge passage 40, as known in the art.

A steering bracket 42 is attached to the drive shaft housing 32 in a conventional matter. The steering bracket 42 also is pivotably connected to a clamping bracket 44. The clamping bracket 44, in turn, is configured to attach to a transom 46 of the watercraft 48. This conventional coupling permits the outboard drive 10 to be pivoted relative to the steering bracket 42 for steering purposes, as well as to be pivoted relative to the clamping bracket 44 to permit adjustment to the trim position of the outboard drive 10 and for tilt up of the outboard drive 10.

Although not illustrated, it is understood that a conventional hydraulic tilt and trim cylinder assembly, as well as a conventional hydraulic steering cylinder assembly could be used as well with the present outboard drive 10. It is also understood that the above description of the construction of the outboard drive is conventional, and, thus, further details of the steering, trim, and mounting assemblies are not necessary for an understanding of the present invention.

As illustrated in FIG. 1, the drive shaft 28 extends through and is journaled within the drive shaft housing 32. A transmission (not shown) selectively couples the drive shaft 28 to a propulsion device 50. The transmission desirably is a forward/neutral/reverse-type transmission to selectively drive the propulsion device 50 in a reverse or forward direction.

The propulsion device 50 desirably comprises a propeller, a hydrodynamic jet, or the like. In the illustrated embodiment, the propulsion device 50 includes a single propeller 52; however, it is understood that a counter-rotational propeller device can be used as well. The propeller 50 desirably includes a hub 54 through which exhaust gases are discharged. For this purpose, the propeller hub 54 communicates with the discharge passage 40 of the lower unit 34, as known in the art.

Figure 2:
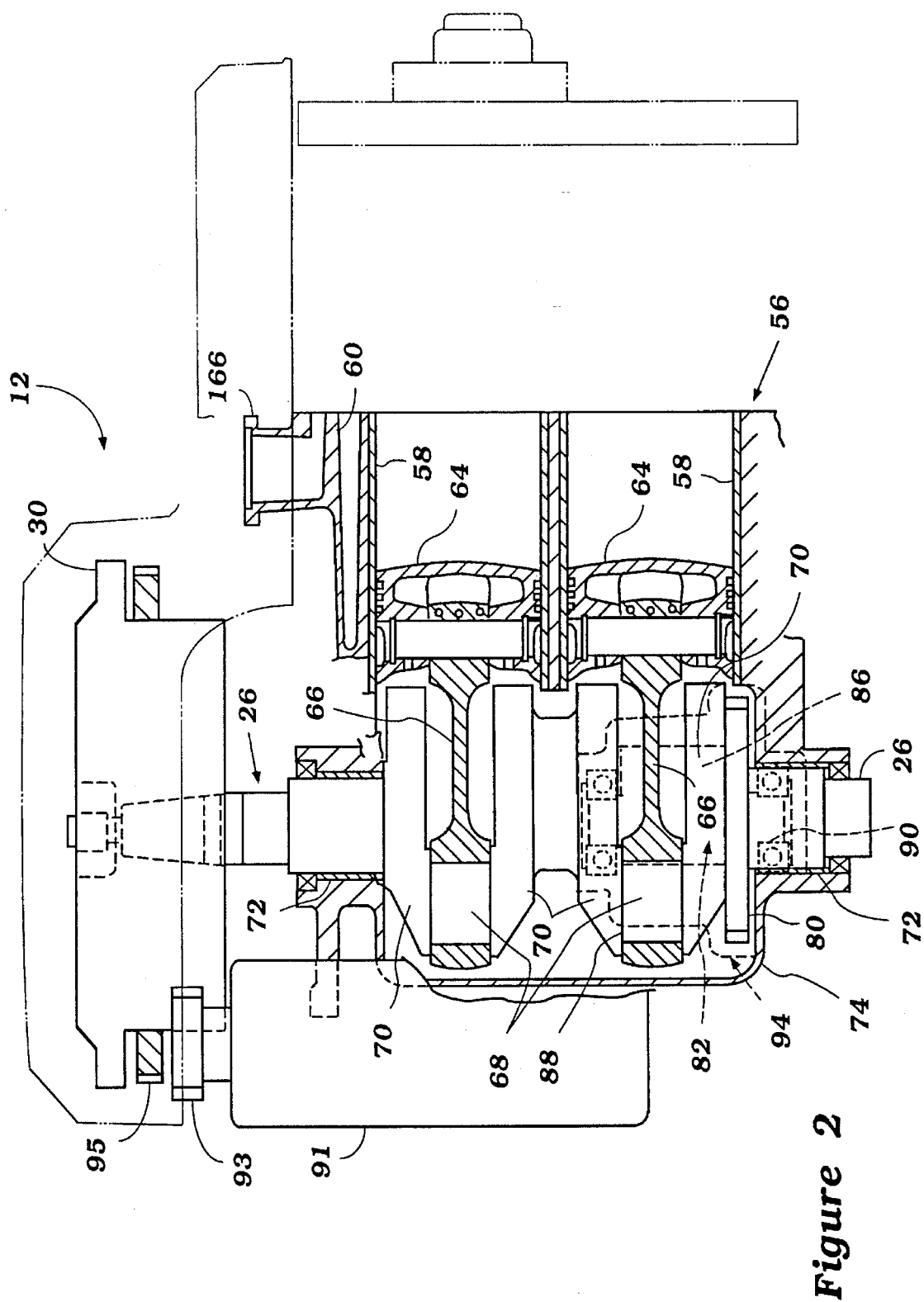
FIG. 2 is a left side partial sectional, elevational view of the engine of FIG. 1.
Figure 3:
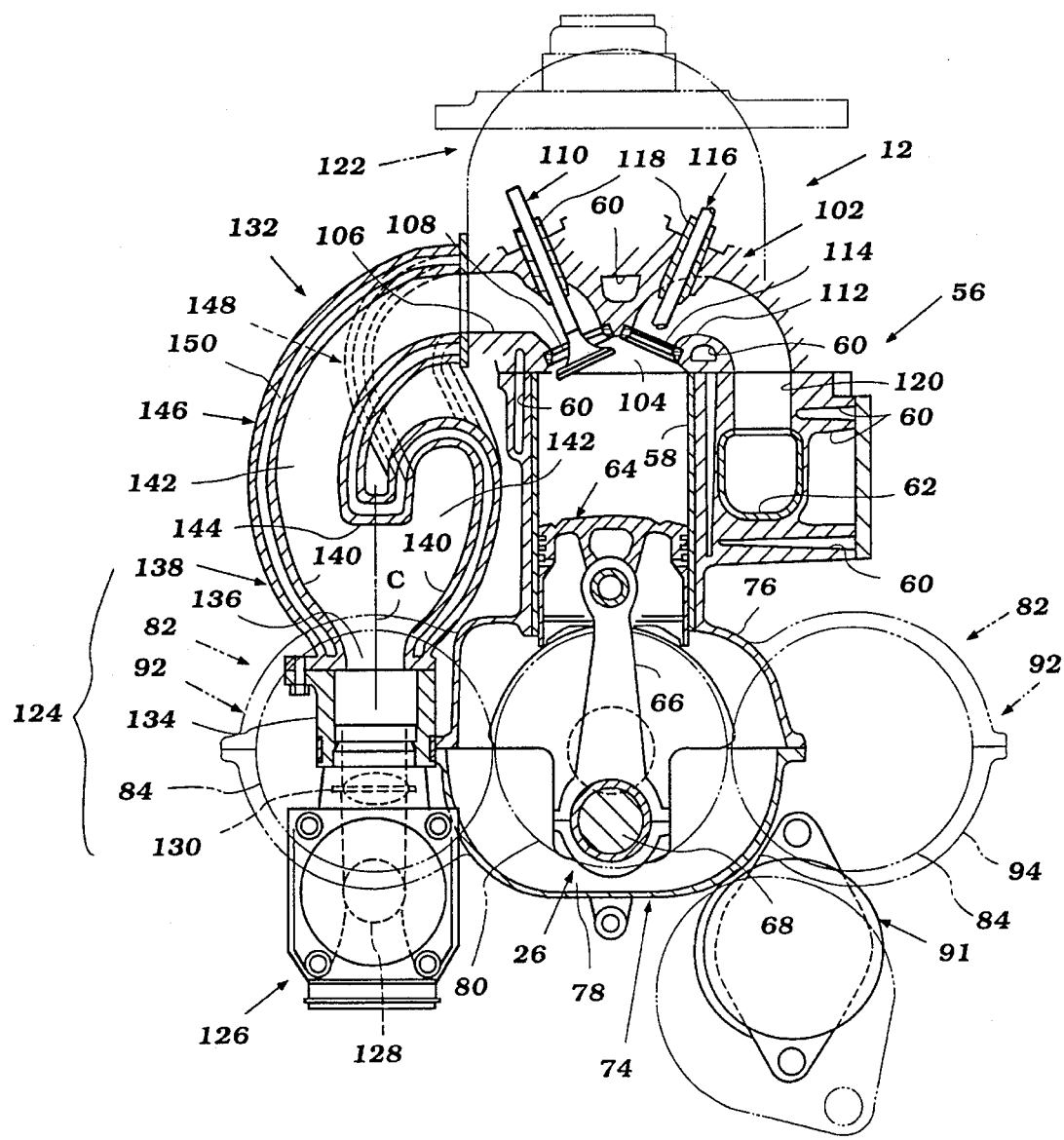
FIG. 3 is a top plan, partial sectional view of the engine of FIG. 2.

FIGS. 2 and 3 best illustrated the present engine 12. The engine 12 includes a cylinder block 56 which in the illustrated embodiment defines two cylinder bores 58. The cylinder bores 58, as understood from FIGS. 1 and 2, have their axes lying on different horizontal planes, yet lying within a common vertical plane (i.e., the cylinder bores 58 are in-line along a vertical axis). As seen in FIGS. 2 and 3, the cylinder block 56 also defines a plurality of water jacket passages 60 which pass through the block 56 and form part of the present water circulation system 14, as described below.

As best seen in FIG. 3, the cylinder block 56 also defines an exhaust manifold passage 62 which extends through the block 56 in a direction generally parallel to the axis of the crankshaft 26. The exhaust manifold passage 62 lies to one side of the in-line cylinders 58. As understood from FIGS. 1 and 3, the exhaust manifold 62 communicates with the exhaust pipe 36 in order to discharge engine gases through the lower unit 34 as described above. With reference to FIG. 3, several of the water jacket passages 60 also extend along the sides of the exhaust passage manifold 62 for heat exchange purposes, as discussed below.

With reference to FIGS. 2 and 3, pistons 64 reciprocate within the cylinder bores 58. Connecting rods 66 link the pistons 64 to the crankshaft 26 so that the reciprocal linear movement of the pistons 64 rotates the crankshaft 26 in a known manner.

As best seen in FIG. 2, the crankshaft 26 includes a pair of spaced rod journals 68 which lie off-center from the crankshaft axis. A pair of connecting rod throws 70 support each rod journal 68 in this off axis position. An end of one of the connecting rods 66 is coupled to the rod journal 68 so as to link the corresponding piston 64 and the crankshaft 26 together in a known manner.

A pair of bearings 72 journal the crankshaft 26 in a crankcase 74 attached to the cylinder block 46. As best understood from FIG. 3, the crankcase 74 and a skirt 76 of the cylinder block 56 together define a crank chamber 78 which houses the journal rods 68 and rod throws 70 of the crankshaft 26.

As seen in FIGS. 2 and 3, the lower end portion of the crankshaft 26 carries a balancer drive gear 80. The drive gear 80 desirably is a spur-type gear; however, it is contemplated that other types of gears also may be used. The drive gear 80 rotates with the crankshaft 26 within the crank chamber 78.

The engine 12 also desirably includes a pair of external balancer shafts 82 which are driven by the crankshaft 26. The balancer shafts 82 extend along a portion of the length of the crankshaft 26 and desirably extend upwardly in a direction generally parallel to the crankshaft 26 from a position proximate to the lower end portion of the crankshaft 26. The balancer shafts 82 desirably balance the forces generated by the reciprocation of the pistons 64 and rods 66 and rotation of the crankshaft 26.

Figure 4:
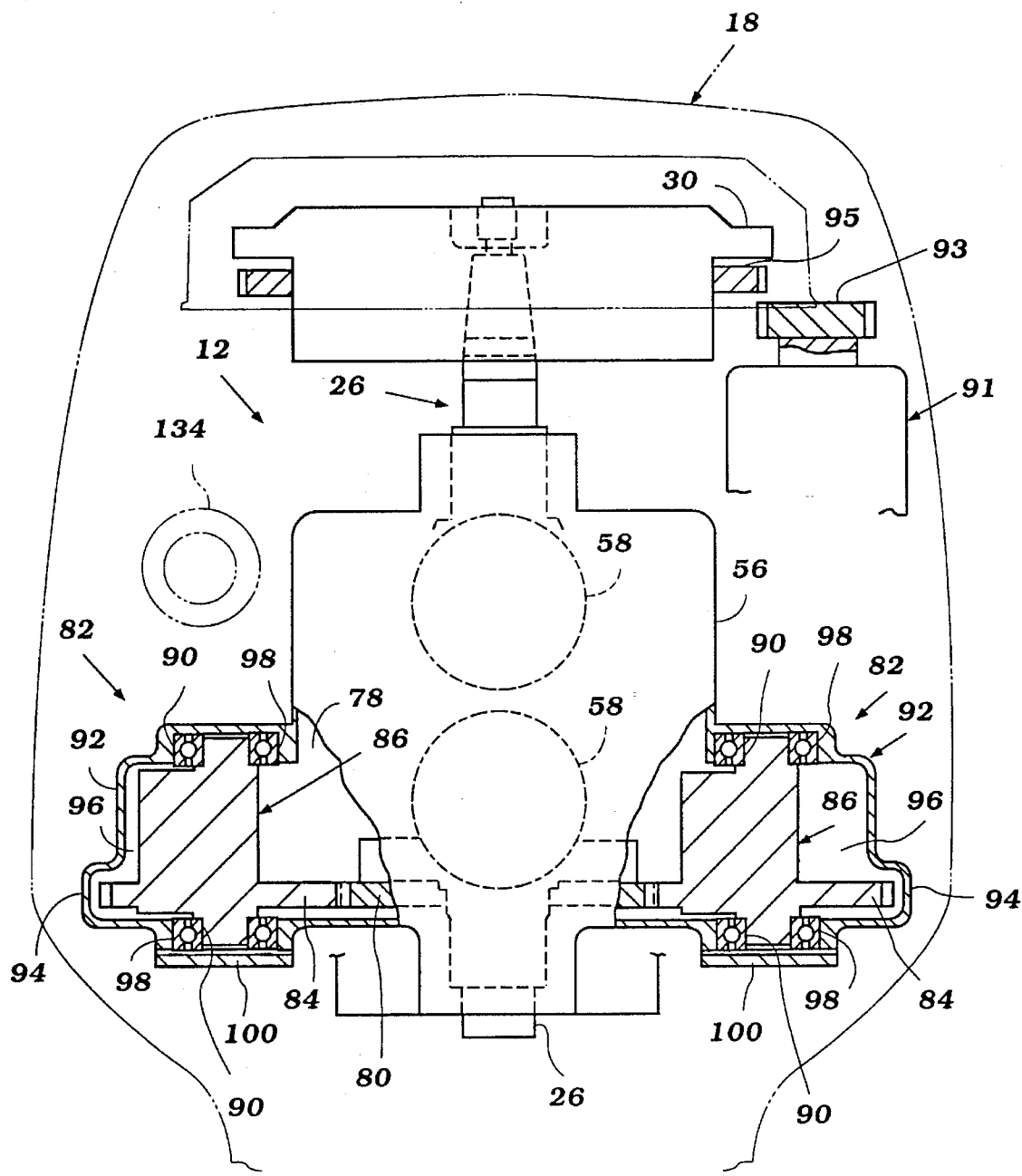
FIG. 4 is front elevational, partial sectional view of the engine of FIG. 2.

As seen in FIG. 4, each balance shaft 82 includes a driven gear 84 which cooperates with the drive gear 80 of the crankshaft 26. That is, the crankshaft drive gear 80 drives the driven gear 84 of each balance shaft 82. The drive gear 80 and the driven gears 84 desirably have the same diametric size and the same number of gear teeth such that the gears 80, 84 rotate at the same rotational speed, but in opposite directions.

Each balancer shaft 82 also includes an eccentric body 86. The centroid of the body 86 lies to the side of the rotational axis of the balancer shaft 82. The length of each eccentric body desirably equals about the distance across a pair of corresponding rod throws 70 of the crankshaft 26. The rotation of the eccentric bodies 86 of the balancer shafts 82 balances the forces produced by the reciprocal motion of the engine 12.

As understood from FIG. 4, the rotation of the eccentric bodies 86 of the balancer shafts 82 are in phase with each other. That is, the rotational position of each eccentric body 86 relative to its respective rotational axis generally is identical with the rotational position of the other eccentric body 86 relative to its rotational axis.

With reference to FIG. 2, the length of each shaft 82 is less than the combined distance across both of the in-line cylinder bores 58, and desirably is as short as possible in order to minimize the size and weight of the balancer shafts 58. Thus, the balancer shafts 82 have a length significantly shorter than the length of the crankshaft 26, and preferable shorter than the distance between the uppermost and lowermost rod throws 70 of the crankshaft 26. In the illustrated embodiment, the eccentric body 86 of each shaft 82 has a length generally equal to about the distance between the drive gear 80 and an upper end 88 of the lower journal rod 68 of the crankshaft 26. That is, the eccentric bodies 86 of each balancer shaft 82 extend upward from the corresponding driven gear 84 to a point proximate to the lowermost rod journal 68. So configured, the balancer shafts 82 lies beside the lower portions of the crankcase 74 and the cylinder block 56.

As best seen in FIG. 4, a pair of bearings 90 journal the ends of each balancer shaft 82 within the crankcase chamber 78. In the illustrated embodiment, each bearings 90 desirably comprises a ball bearing assembly.

The balancer shafts 82 are positioned on diametrically opposite sides of the camshaft 26. In the illustrated embodiment, the balancer shafts 26 lie on opposite sides of the cylinder block 56, generally to the exterior of the cylinder block 56 and the crankcase 74. As seen in FIG. 3, one balancer shaft 56 lies on the same side of the cylinder block 56 as the exhaust manifold 62. The other balancer shaft 82 lies on the same side of the cylinder block as the engine accessories (e.g., intake manifold, carburetor), as described below. As understood from FIGS. 2 and 3, the balance shaft on the exhaust side of the cylinder block 56 also lies to the rear of and generally below a starter 91. The starter desirably is positioned as illustrated so as to allow a starter gear 93 of the starter 91 to engage a ring gear 95 of the flywheel assembly 30 to automatically start the engine 12, as known in the art. Manual starting of the engine 12 desirably is also possible.

With reference to FIG. 4, the eccentric bodies 86 of the balancer shafts 82 lie on a side of the rotational axis of the crankshaft 26 opposite of the rod journals 68 of the crankshaft 26 when the pistons 64 are in the top-dead-center position and in the bottom-dead-center position. That is, the eccentric bodies 86 of the balancer shafts 82 are 180° out of phase from the rod journal rotation, so as to balance the rotating mass of the crankshaft 26, pistons 64, and rods 66 about rotational axis of the crankshaft 26.

A housing 92 encloses and supports each balancer shaft 82. In the illustrated embodiment, the cylinder block 56 and the crankcase 74 together define each housing 92. As best understood from FIG. 5, the cylinder block 56 defines one half of the housing 92 and the crankcase 74 defines the other half. The halves of the housing 92 formed by the cylinder block 56 and the crankcase 74 desirably are mirror images of each other.

With reference to FIG. 4, each housing 92 includes a flared base portion 94 which defines sufficient internal space to allow the driven gear 84 of the balancer shaft 82 to rotate freely. The housing 92 also includes an internal cavity 96 that opens into the crank chamber 78. In this manner, lubricant within the crank chamber 78 can flow into the balancer shaft housing 92 so as to lubricate the support bearings 90 and the driven gear 84. The internal cavity 96 has a sufficient size to allow the eccentric body 86 of the balancer shaft 82 to rotate without interference.

As seen in FIG. 4, the upper and lower ends of each housing 92 define recesses 98 which receive the shaft support bearings 90. An end cap 100 closes the lower end of each housing 92 and supports the lower bearing assembly 90.

With reference to FIG. 3, a cylinder head 102 is attached to the cylinder block 56 on a side thereof opposite of the crankcase 74. The cylinder head 102 has a conventional construction, and supports and houses an intake and exhaust valve system. The cylinder head 102 specifically defines a pair of recesses 104 on its lower surface which correspond with the cylinders 58 of the cylinder block 56. That is, the cylinder head 102 covers each cylinder 58 with one of the recesses 104 lying adjacent to one of the cylinder bores 58. In this manner, each cylinder 58 and corresponding recess 104 together define a combustion chamber, as known in the art. In the illustrated embodiment, each recess 104 desirably has a pent roof configuration.

The cylinder head 102 also defines at least a pair of intake passages 106. One intake passage 106 communicates with one of the recesses 104 through at least one intake port 108, and the other intake passage 106 communicates with the other recess 104 through at least another intake port 108. The peripheral edge of each intake port 108 forms a valve seat which cooperates with a corresponding intake valve 110, as known in the art.

As seen in FIG. 3, the cylinder head 102 additionally defines at least a pair of exhaust passages 112. At least one of the exhaust passages 112 communicates with one of the recesses 104 through at least one exhaust port 114 and the other exhaust passage 112 communicates with the other recess 104 through at least another exhaust port 114. The peripheral edge of each exhaust port 114 forms a valve seat which cooperates with a corresponding exhaust valve 116, as known in the art. FIG. 3 illustrates only the valve stem of the exhaust valve 116 in order to simplify the drawing; however, it should be understood that the exhaust valves include conventional valve heads.

The cylinder head 102 supports each intake and exhaust valve 110, 116 via a valve guide 118 in a manner which allows the valve 110, 116 to reciprocate axially along an axis which is skewed relative to the lower surface of the cylinder head 102. Coil compression springs (not shown) encircle the stems of the valves 110, 116 and act against keeper retainer assemblies (not shown) to bias the valves 110, 116 closed, as known in the art.

Each exhaust passage 112 within the cylinder head 102 communicates with the exhaust manifold 62 via an internal conduit 120 formed within the cylinder block 56. That is, as seen in FIG. 3, each conduit 120 extends between the exhaust manifold 62 and an outlet opening to the exhaust passage 112 at the lower end of the cylinder head 102.

A cam cover 122 is attached to the cylinder head 102, on a side of the cylinder head 102 opposite the cylinder block 56. The cam cover 122 and the cylinder head 102 together define a cam chamber in which a conventional valve operation mechanism is journaled. Because the invention deals primarily with the water circulation system 14 of the engine 12, it is not believed necessary to discuss or describe the particular valve system and/or the valve operation mechanism of the engine 12 in further detail.

Figure 5:
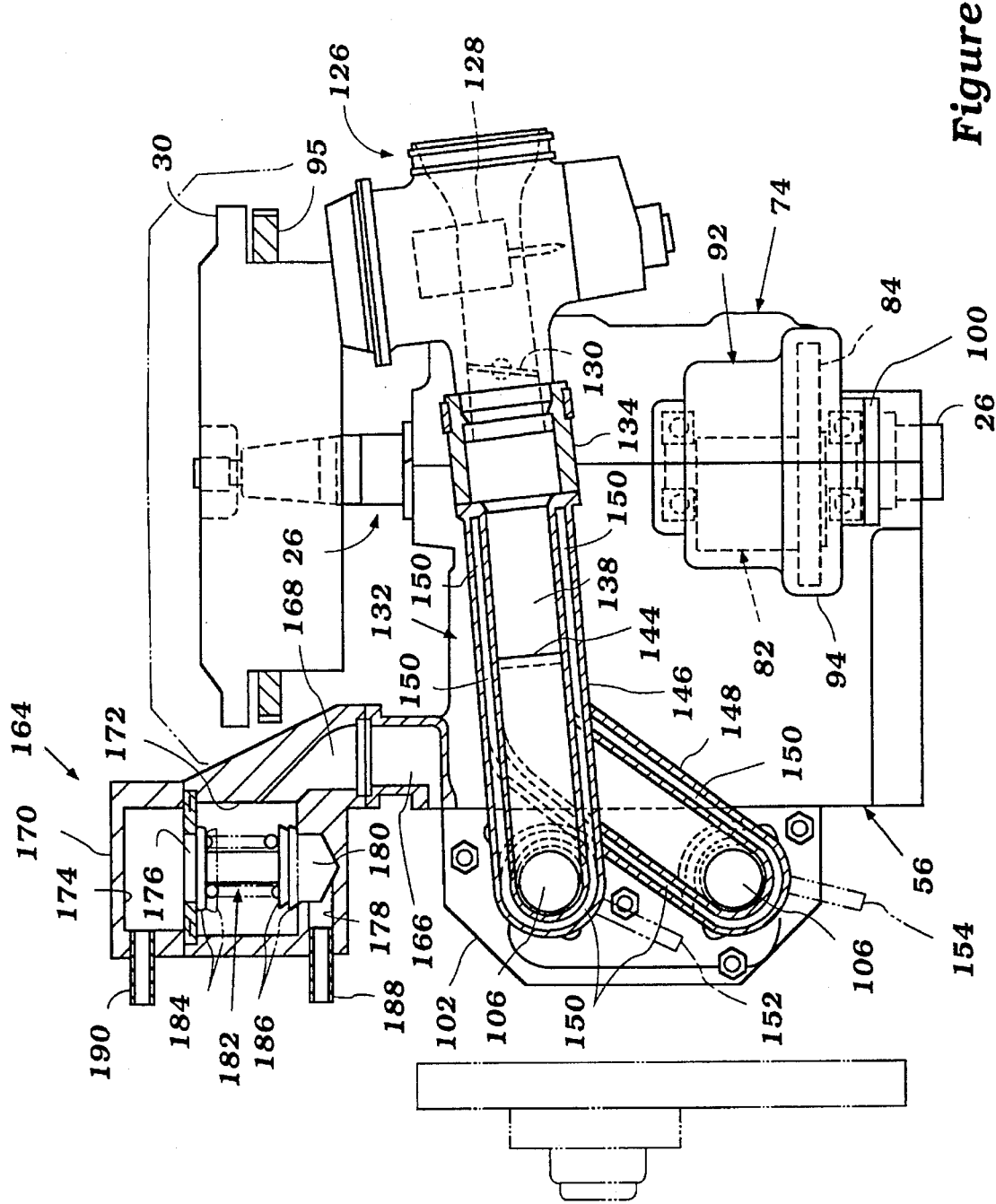
FIG. 5 is a right side partial sectional, elevational view of the engine of FIG. 1.

With reference to FIGS. 3 and 5, the engine 12 also includes an induction system 124 which communicates with the intake passages 106 in the cylinder head 102. The induction system 124 includes a charge former 126 that produces a charge of air and fuel.

In the illustrated embodiment, the charge former 126 comprises a venturi-type carburetor with an automatic piston-type valve 128. The known piston valve 128 automatically open under the initial negative pressure product by engine 12, and meters fuel flow into the carburetor depending upon air flow through the charge former 126. The carburetor 126 also includes a throttle valve 130 to control air flow through the carburetor 126.

The charge former 126 is attached to an end of an intake manifold 132 via a carburetor joint 134. As seen in FIGS. 3 and 5, the charge former 126 lies to the side of the crankcase 74 and above the balancer shaft 82 in a position which minimizes the girth of the engine 12. The carburetor 126 also lies slightly above the intake passages 106 of the cylinder head 102 in the position described above, as best seen in FIG. 4. The carburetor joint 134 desirably lies beside the joint formed between the crankcase 74 and the cylinder block 56 in order to support the charge former 126 in the position described above.

The intake manifold 132 delivers the charge formed by the charge former 126 to the individual combustion chambers through the intake passages 106 and corresponding intake valve system. FIGS. 3 and 5 best illustrated the intake manifold 132.

The intake manifold 132 includes an inlet 136 which communicates with the bore of the carburetor joint 134. The inlet 136 opens into a chamber 138 which, as seen in FIG. 3, generally has a symmetric shape relative to a centerline C of the chamber. The inlet opening 136 also lies symmetrically relative to the chamber centerline C so that the centerline C of the chamber 138 and the centerline of the carburetor joint 134 are collinear.

The chamber 138 gradually diverges relative to the centerline C (i.e., increases in width) in a direction away from the inlet opening 136. In the illustrated embodiment, curved walls 140 define the diverging shape of the chamber 138. The chamber 138, as seen in FIG. 5, also has a uniform height.

With reference to FIG. 3, the chamber 138 also includes a pair of outlet openings 142 on a side of the chamber 138 opposite of the inlet opening 136. The outlet openings 142 are symmetrically spaced apart on opposite sides of the chamber centerline C.

A flat divider surface 144, which also lies symmetric to the chamber centerline C, separates the two outlet openings 142. The divider 144 lies generally transverse to the charge flow through the inlet opening 136. In this manner, the divider 144 generally causes the charge flow through the chamber 138 to divide equally between the two outlet openings 142. The intake manifold 132 thus delivers an equal charge to both cylinders 58.

With reference to FIG. 3, the chamber 138 communicates with the pair of runners 146, 148 via the outlet openings 142. In the illustrated embodiment, the curved walls 140 of the chamber 138 blend smoothly into the outer wall portion of the corresponding runner 146, 148. The inner wall portion of each runner 146, 148 extends from the corresponding edge of the divider surface 144.

Each runner 146, 148 desirably has a tubular shape. The diameters of the runner 146, 148 preferably equal each other and match the height of the chamber 138, as best seen in FIG. 5. And, as seen in FIG. 3, the diameter of the runners 146, 148 also desirably match the width of the divider plate 144, as measured between the openings 142.

With reference to FIG. 5, the position of the charge former 126 within the engine 12 (i.e., above the balancer shaft 82) requires the intake manifold 132 to be located at about the level of the upper intake passage 106 of the cylinder head 102, above the lower intake passage 106. The lower runner 148 thus must extend downward from the outlet opening 142 of the intake manifold chamber 138. As seen in FIG. 3, the lower runner 148 also bends away from the cylinder block 56 and then bends back towards the cylinder head 102 so as to direct the charge flow in a direction generally parallel to the initial flow path defined by the lower intake passage 106.

The upper runner 146 desirably has a length generally equal to that of the lower runner 148 for tuning purposes, as known in the art. For this purpose, the upper runner 146 curves outwardly away from the cylinder block 56 on the outer side of the lower runner 148. The upper runner 146 then curves back toward the cylinder head 102 so as to direct the charge flow in a direction generally parallel to the initial flow path defined by the upper intake passage 106. As seen in FIG. 3, the radius of curvature of the upper runner 146 is significantly larger than that of the lower runner 148 such that the upper runner 146 extends further away from the cylinder block 56 than the lower runner extends.

With reference to FIG. 5, the chamber 138, the upper runner 146 and the lower runner 148 of the intake manifold 132 all lie at a skewed angle relative to the axes of the cylinder bores 58 and decline from the position of the charge former 126. In this manner, the fuel charge flow through the intake manifold 132 is assisted by gravity (i.e., is downhill).

As seen in FIGS. 3 and 5, the intake manifold 132 also includes an outer water heating jacket 150. The heating jacket 150 defines a water flow passage about the circumferences and along the lengths of the chamber 138 and the runners 146, 148 of the intake manifold 132. The heating jacket 150 also includes an inlet port 152 and an outlet port 154. The heating jacket 150 of the intake manifold 132 forms part of the present water circulation system 14 and communicates with the balance of the water circulation system 14 via its inlet and outlet ports 152, 154, as described below.

With reference to FIG. 1, the water circulation system 14 of the present engine 12 includes a water pickup port 156 which desirably is positioned on a leading side of the lower unit 34. A water pump 158 draws water through the inlet port 156 into the water circulation system 14. The water pump 158 lies proximate to the joint between the drive shaft housing 32 and the lower unit 34, and is driven by the drive shaft 28 as known in the art. The water pump 158 pumps water up to the engine 12 through a water pickup conduit 160.

The water pickup conduit 160 communicates with the water jacket passages 60 in the cylinder block 56 and cylinder head 102, which form part of the water circulation system 14. As schematically illustrated in FIG. 1, the water from the pickup conduit 160 flows through the cylinder block 56 and cylinder head 102, flowing around the cylinder bores, exhaust passages and exhaust manifold. The cooling water conducts thermal heat from the engine 12 so as to cool the cylinder block 56 and cylinder head 102, as known in the art.

A small portion of the water flow through the engine 12 is discharged through a conventional telltale conduit 162 to indicate operation of the water pump 158 and water flow through the engine 12, as known in the art. The balance of the water flows into a thermostat valve 164.

With reference to FIG. 5, the cooling water specifically exits the engine 12 through a water jacket outlet 166 desirably located on an upper surface of the cylinder block 56. The water jacket outlet 166 communicates with an inlet port 168 of the thermostat valve 164.

The thermostat valve 164 comprises a valve housing 170 which defines an internal valve chamber 172 and an exhaust passage 174. The valve chamber 172 and the exhaust passage 174 communicate through a first opening 176. The housing 170 also defines a recirculation return line port 178 which communicates with the valve chamber 172 via a second opening 180. The first opening 176 and second opening 180 desirably lie on opposite side of the valve chamber 172 from each other.

The housing 170 houses a thermostat valve body 182 within the valve chamber 172. The valve body 182 includes a pair of opposing plates 184, 186 which move axially. The valve body 182 desirably responds to the water temperature to selectively open and close the flow paths through the valve 164. In a first position, the valve body 182 closes the first opening 176 to the exhaust passage 174 and opens the second opening 180 to the recirculation port 178. That is, the upper valve plate 184 lies over the first opening 176 and the lower valve plate 186 lies above, but not covering the second opening 180. The valve body 182 desirable lies in this position when the water temperature is less than a desired lower temperature limit.

In the illustrated embodiment, the desired lower temperature limit is generally about 80° to effectively atomize the fuel charge in the intake manifold 132, as discussed below. Other temperature limits, however, can be selected in order to suit the temperature characteristics of a specific engine.

When the water temperature rises above the desired lower temperature limit, the valve body 182 moves from the first position to a second position. In the second position, the upper valve plate 184 lies beneath, but does not cover the first opening 186 so as to open the first opening 176. The lower valve plate 186 remains open. In this position, the valve body 182 opens both the second opening 180 to the recirculation port 178 and the first opening 176 to the exhaust passage 174 so that water can flow through both passages 174, 178.

When the water temperature rises above a desired upper temperature limit, the valve body 182 moves from the second position to a third position. In the third position, the lower plate 184 closes the second opening 180. The upper plate 184, however, remains open so that all water flow through the valve 164 exits through the water exhaust passage 174.

A recirculation return conduit 188 connects to the recirculation return port 178 of the valve 164. As seen in FIG. 1, the return conduit 188 extends downward through the drive shaft housing and connects to the water pickup line 160 on the inlet side of the water pump 158. In this manner, water of a temperature less than a desired temperature level recirculates through the engine 12 so as to elevate and generally stabilize the temperature of the cooling water flowing through the engine 12.

An exhaust water conduit 190 connects to the exhaust passage of the valve housing 170. When the valve 164 opens to the second or third positions, water flows through the exhaust passage 174 and into the exhaust water conduit 190.

As understood from FIG. 1, the exhaust water conduit 190 is connected to the inlet port 152 of the heating jacket 150 of the intake manifold 132. Hot water from the conduit 190 flows through the passage of the heating jacket 150 and out the outlet port 154. In this manner, the temperature of the intake manifold 152 is elevated and maintained at a desired temperature, as discussed below.

An exhaust water drainage conduit 192 connects to the outlet port 154 of the heating jacket 150 of the intake manifold 132. The water drainage conduit 192 directs the exhaust water into the exhaust pipe 36 for discharge with the exhaust gases from the engine 12 through the propeller hub 54, as described above.

The above described water circulation system 14 effectively cools the engine during operation and maintains the intake manifold 132 at a temperature within a desired temperature range. The cool pickup water recirculates through the engine 12 until the water reaches a desired temperature level. The valve 164 then opens to allow a portion of the heated water to flow through the heating jacket 150 of the intake manifold 132 and to then discharge through the exhaust system.

The portion of the water recirculation through the engine 12 continues to increase in temperature with the valve in its second position (i.e., both outlet ports 176, 178 open). The portion of the water flowing through the exhaust passage likewise increases in temperature. The temperature of the intake manifold 132 thus continues to increase.

It is desirably, however, to restrict the temperature of the intake manifold 132 so as not to significantly affect the volumetric efficiency of the engine 12. If the density of the air of the fuel charge decreases too much with the elevated temperature of the intake manifold 132, the volumetric efficiency of the engine will significantly decease. Engine power decreases as a consequence.

The thermostat valve 164 thus closes the recirculation path 188 of the water circulation system 14 so not to over heat the water flowing through the heating jacket 150 of the intake manifold 132. The upper temperature limit desirably is selected to be generally equal to a temperature at which an optimum balance exists between a desired volumetric efficiency and a desired fuel vaporization level for the particular engine.

If the water temperature drops below the upper temperature limit, the thermostat valve 164 reopens the recirculation path to further heat a portion of the water flow through the circulation system 14, as described above. In this manner, the water circulation system maintains the temperature of the water flowing through the heating jacket 150 of the intake manifold 132 with the desired temperature range, between the upper and lower temperature limits.

The present water circulation system 14 also generally stabilizes the temperature of the water flowing through the cooling jacket 60 of the engine 12. The valve 164 generally maintains the water flowing through the engine water jacket 60 within the temperature range defined between the upper and lower temperature limits. The upper and lower portions of the engine 12 consequently generally have equal temperatures which improves the consistency of fuel combustion between the cylinders.

Although this invention has been described in terms of a certain preferred embodiment, other embodiments apparent to those of ordinary skill in the art are also within the scope of this invention. Accordingly, the scope of the invention is intended to be defined only by the claims which follow.

What is claimed is:

1. A water circulation system for a watercraft engine of the type including an intake manifold and an exhaust discharge system, said water circulation system comprising a heating jacket configured to extends along at least a portion of the intake manifold and a control valve which communicates with said heating jacket through a first outlet port of said control valve, an engine water jacket formed within the engine, said engine water jacket being connected to said control valve such that water flow through said water circulation system flows through said engine water jacket and into said control valve, and a recirculation conduit which connects a second outlet port of said control valve to an inlet of the engine water jacket so as to recirculate water flow between said control valve and said engine water jacket, said control valve adapted to prevent water flow through said heating jacket when the temperature of the water is below a desired preset lower temperature limit, and adapted to direct water flow through said first port and to prevent water flow through said second port when the temperature of the water entering said control valve from said engine water jacket is above a desired preset upper temperature limit.

2. A water circulation system as in claim 1, wherein said control valve is adapted to direct water flow through said second port so as to recirculate water flow through said engine water jacket when the temperature of the water entering said control valve from said engine water jacket is below said desired lower temperature limit.

3. A water circulation system as in claim 1, wherein said control valve is adapted to direct water flow through said first and second ports when the temperature of the water is above said desired lower temperature limit, but below a desired preset upper temperature limit.

4. A water circulation system as in claim 1 additionally comprising a water discharge conduit which connects said heating jacket to the exhaust discharge system of the engine to discharge water from said water circulation system.

5. A water circulation system as in claim 1, wherein said heating jacket surrounds and extends along the length of a plurality of runners of the intake manifold, said runners communicating with intake passages formed within a cylinder head assembly of the engine.

6. A water circulation system as in claim 5, wherein said heating jacket surrounds a chamber which communicates with each runner of the intake manifold.

7. A water circulation system as in claim 5, wherein said heating jacket is at least commensurate with a dividing surface of the intake manifold which divides a flow of fuel charge generally equally among the plurality of runners.

8. A water circulation system for a watercraft engine of the type including an intake manifold and an exhaust discharge system, said water circulation system comprising an engine water jacket formed within the engine, a control valve which communicates with said engine water jacket through an inlet port of said control valve, a recirculation conduit being connected to a first outlet port of said control valve and communicating with an inlet of said engine water jacket so as to recirculate water through the engine water jacket, a water exhaust conduit being connected to a second outlet port of said control valve and communicating with the exhaust discharge system of the engine so as to discharge cooling water from said water circulation system, and a heating jacket which at least partially surrounds the intake manifold of the engine, said heating jacket positioned within said water exhaust discharge line so as to received heated water from said engine water jacket through said second port of said control valve, said control valve adapted to prevent water flow through said first port and to direct water flow through said second port when the temperature of the water entering said valve from said engine water jacket is above a desired preset upper temperature limit so as to discharge the circulating water.

9. A water circulation system as in claim 4, wherein said control valve is adapted to prevent water flow through said second port and to direct water flow through said first port when the temperature of the water entering the valve from said engine water jacket is below a desired preset lower temperature limit.

10. A water circulation system as in claim 9, wherein said control valve is adapted to direct water flow through both said first and second ports when the temperature of the water entering the valve from said engine water jacket is above the desired preset lower temperature limit and below the desired preset upper temperature limit.

11. A water circulation system as in claim 4 additionally comprising a water pump arranged such that said recirculation conduit communicates with an inlet of said water pump and an outlet of said pump communicates with said inlet of said engine water jacket, said water pump further communicating with a water pickup port to draw water into said water circulation system.

12. A marine engine comprising a plurality of intake passages which communicate with a plurality of combustion chambers within the engine, the engine being of the type formed in part by a cylinder block and a crankcase member, a skirt of said cylinder block and said crankcase member joining together at corresponding mating surfaces to form a crankcase, said intake manifold comprising an inlet opening into a chamber, said chamber communicating with a plurality of runners extending between said chamber and the plurality of intake passages so as to place said chamber in communication with the intake passages, and at least one charge former communicating with said inlet opening of said intake manifold, said charge former being positioned on a side of said mating surfaces of said crankcase member and said cylinder block opposite of said intake manifold.

13. A marine engine as in claim 6 additionally comprising a heating jacket which communicates with a water circulation system of the engine, said heating jacket extending along at least a portion of each runner of said intake manifold.

14. A marine engine as in claim 13, wherein said heating jacket extends along at least a portion of said chamber.

15. A marine engine as in claim 14, wherein said heating jacket surrounds and extends along the entire length of each runner and completely surrounds the walls of said chamber of said intake manifold.

16. A marine engine as in claim 12, wherein an equal number of runner are positioned on one side of said divider as are positioned on the other side of said divider.

17. A marine engine as in claim 12, wherein said runners have equal lengths.

18. A marine engine as in claim 12, wherein the number of runners corresponds to the number of combustion chambers of the engine.

19. A marine engine as in claim 12, wherein the width of the divider between said outlets generally equals the diameter of one of said runners.

20. A marine engine as in claim 19, wherein said divider comprises a flat plate that is oriented generally transverse to a direction of charge flow through said inlet opening of said intake manifold.

21. A marine engine as in claim 12, wherein said chamber and said runners slope downwardly away from said inlet opening.

22. A marine engine as in claim 8, wherein said chamber generally has a symmetric shape relative to a centerline of said inlet and terminates at a divider which is positioned opposite of said inlet and is positioned generally symmetric to said centerline of said inlet.

23. A marine engine as in claim 8, wherein said chamber communicates with said plurality of runners via outlets in said chamber positioned proximate to said divider.

* * * * *